US011118540B2

(12) United States Patent
Slayter et al.

(10) Patent No.: US 11,118,540 B2
(45) Date of Patent: Sep. 14, 2021

(54) VENTED TANK SYSTEMS AND COMPONENTS

(71) Applicant: Hamilton Sundstrand Corporation, Charlotte, NC (US)

(72) Inventors: Matthew Allen Slayter, Rockford, IL (US); Jeffrey Todd Roberts, Winnebago, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 16/247,188

(22) Filed: Jan. 14, 2019

(65) Prior Publication Data
US 2020/0224612 A1 Jul. 16, 2020

(51) Int. Cl.
*F02M 25/08* (2006.01)
*B64D 37/00* (2006.01)
*B64D 37/06* (2006.01)

(52) U.S. Cl.
CPC ....... *F02M 25/0872* (2013.01); *B64D 37/005* (2013.01); *B64D 37/06* (2013.01)

(58) Field of Classification Search
CPC .... F02M 25/0872; B64D 37/02; B64D 37/06; B64D 37/005; B65D 88/54; B65D 88/64; B65D 88/70; B65D 88/703; B65D 88/706; B65D 88/74; B65D 88/741
USPC ...................................................... 220/745
See application file for complete search history.

(56) References Cited

U.S. PATENT DOCUMENTS

| 3,239,095 | A | * | 3/1966 | Jones ..................... B65D 90/22 220/745 |
| 3,807,465 | A | * | 4/1974 | Ginsburgh ............... B67D 7/54 141/285 |
| 4,538,636 | A | | 9/1985 | Cleland |
| 4,668,252 | A | * | 5/1987 | Gerdau ............. B01D 19/0042 184/6.16 |
| 4,892,140 | A | * | 1/1990 | Honovich ................. F28B 9/10 165/110 |
| 5,244,022 | A | | 9/1993 | Gimby |
| 5,247,958 | A | * | 9/1993 | Deparis ............ B60K 15/03519 137/43 |
| 6,607,005 | B2 | | 8/2003 | Viebahn et al. |

FOREIGN PATENT DOCUMENTS

DE 102005053815 A1 5/2007

OTHER PUBLICATIONS

M.R. Ghomi et al: "An experimental study of nozzle diameters, aeration depths and angles on standard aeration efficiency (SAE) in a venturi aerator", Water Practice and Technology, vol. 4, No. 3, Sep. 1, 2009 (Sep. 1, 2009), XP055699878.

(Continued)

*Primary Examiner* — Don M Anderson
(74) *Attorney, Agent, or Firm* — Locke Lord LLP; Daniel J. Fiorello; Gabrielle L. Gelozin (57) ABSTRACT

A tank vent tube for a deaerator tank system, comprising a tube body. The tube body can define a vent channel. The tube can include a relief hole defined through the tube body. The tube can include a venturi structure disposed in the vent channel of the tube body at least partially over the relief hole. The venturi structure can be configured to reduce pressure over the relief hole as a function of flow in the vent channel.

14 Claims, 6 Drawing Sheets

(56) References Cited

OTHER PUBLICATIONS

Tamer Bagatur et al: "Testing of System Performance for Different Aerator Configuration Using Venturi", El-Cezeri Fen Ve Muhendislik Dergisi, vol. 5, No. 3, Sep. 30, 2018 (Sep. 30, 2018), pp. 724-733, XP055699879.
Extended European Search Report issued in corresponding EP application No. EP19211903.0, dated Jun. 23, 2020.
Office Action from the European Patent Office for European Patent Application No. EP19211903.0, dated Feb. 24, 2021.

\* cited by examiner

STATIC, EVEN PRESSURE

VENTED TANK SYSTEMS AND COMPONENTS

BACKGROUND

1. Field

This disclosure relates to vented tank systems, e.g., for deaerator systems for aircraft.

2. Description of Related Art

Certain aircraft tanks need a venting system. Certain designs of tank vents limit the venting system to maintain some positive pressure. Deaerator systems inside the tank traditionally include a centralized tube to feed the air out to the vent. There are a variety of situations that create an undesirable syphon effect through the tube due to pressure differences between the tank and the venting chamber. When these events take place, e.g., immediately after aircraft shut down, a pressure head of air can exist in the tank and cause a fluid in the tank (e.g., oil) to be drained through the tube.

Such syphoning is traditionally mitigated by a small hole in the tube in the location of the air head to aid in pressure equalization by venting the pressure head to the venting chamber. Traditional designs may not be effective to prevent significant fluid flow out of the tank due to size constraints. Also, in existing systems, once a syphon is established, the vent hole can be internally blocked by liquid flow and can cause prolonged syphoning.

Such conventional methods and systems have generally been considered satisfactory for their intended purpose. However, there is still a need in the art for improved vented tank systems and components therefor. The present disclosure provides a solution for this need.

SUMMARY

In accordance with at least one aspect of this disclosure, a tank vent tube for a deaerator tank system, comprising a tube body configured to mount to a deaerator tank. The tube body can define a vent channel. The tube can include a relief hole defined through the tube body. The tube can include a venturi structure in the vent channel of the tube body at least partially over the relief hole. The venturi structure can be configured to reduce pressure over the relief hole as a function of flow in the vent channel.

The venturi structure can be defined by and integral with the tube body. The venturi structure can include a wall extending across the vent channel. The wall can define an inlet and an outlet between the wall and an interior surface of the tube body. The inlet can include a larger flow area than the outlet.

In certain embodiments, the wall can include an angled and/or curved shape in a direction of flow to form a reducing channel between the wall and the interior surface of the tube body. For example, the wall can be an angled or curved plate.

The tube can include a scoop extending from an outer surface of the tube body over the relief hole to define a relief inlet channel. The scoop can open downward with respect to a direction of gravity, for example.

In certain embodiments, the tube body can include a U-shape. Any other suitable shape is contemplated herein.

In accordance with at least one aspect of this disclosure, a deaerating system can include a deaerator tank configured to contain a liquid therein, and a tank vent tube at least partially in the deaerator tank. The tank vent tube can include any suitable tank vent tube disclosed herein (e.g., as described above).

In accordance with at least one aspect of this disclosure, a method can include increasing speed of a flow in a tank vent tube over a relief hole in the tank vent tube to reduce pressure equalization time and reduce fluid loss through the vent tube. Any other suitable method and/or portion(s) thereof as appreciated by those having ordinary skill in the art in view of this disclosure are contemplated herein.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
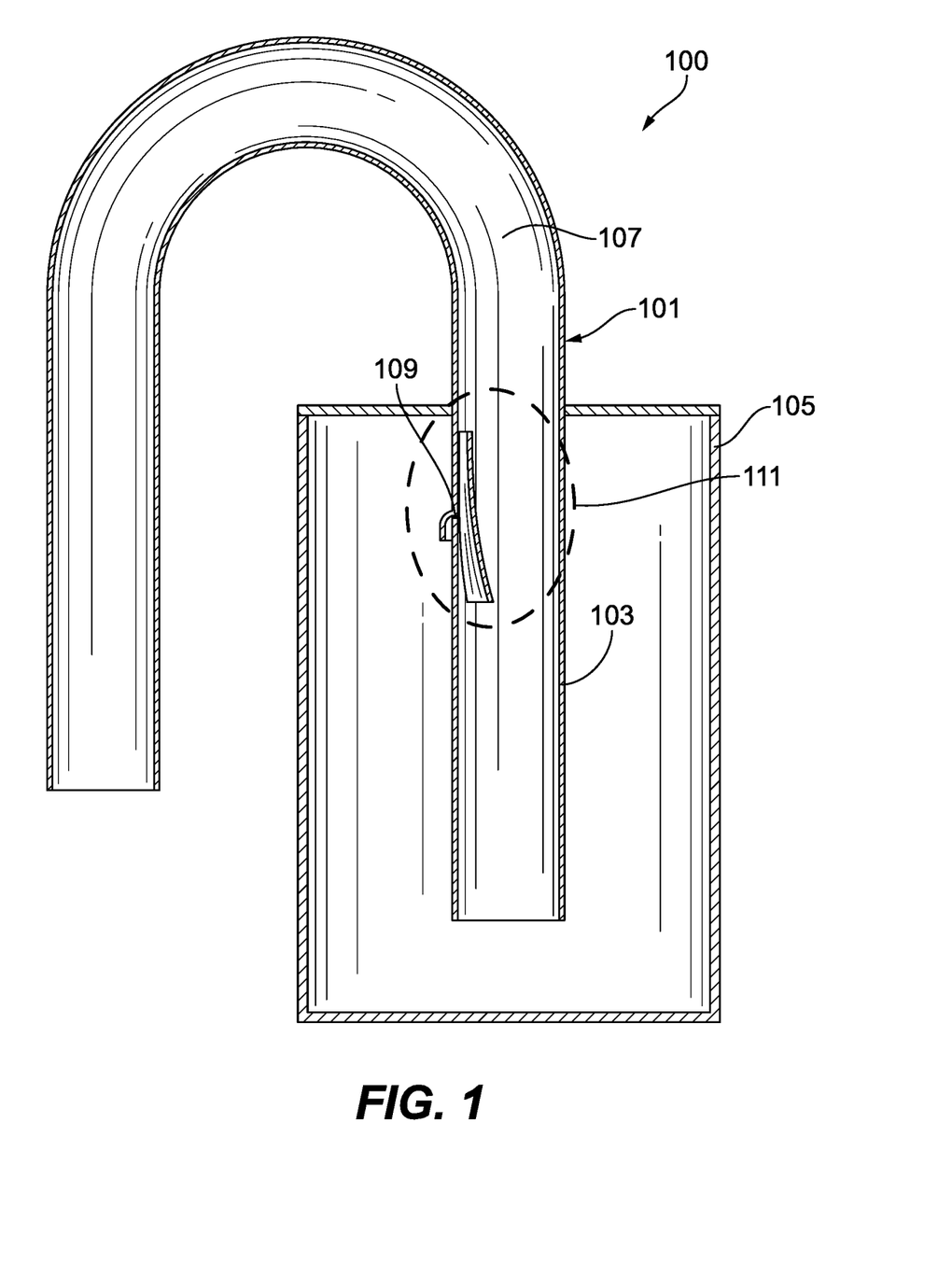
FIG. 1 is a cross-section view of an embodiment of a system in accordance with this disclosure.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Other embodiments and/or aspects of this disclosure are shown in FIGS. 2-6.

Referring to FIG. 1, a deaerator system 100 can comprise a tank vent tube 101. The tank vent tube 101 for a deaerator tank system can include a tube body 103 configured to mount to a deaerator tank 105 to be partially disposed within the deaerator tank 105. The tube body can define a vent channel 107.

Figure 2:
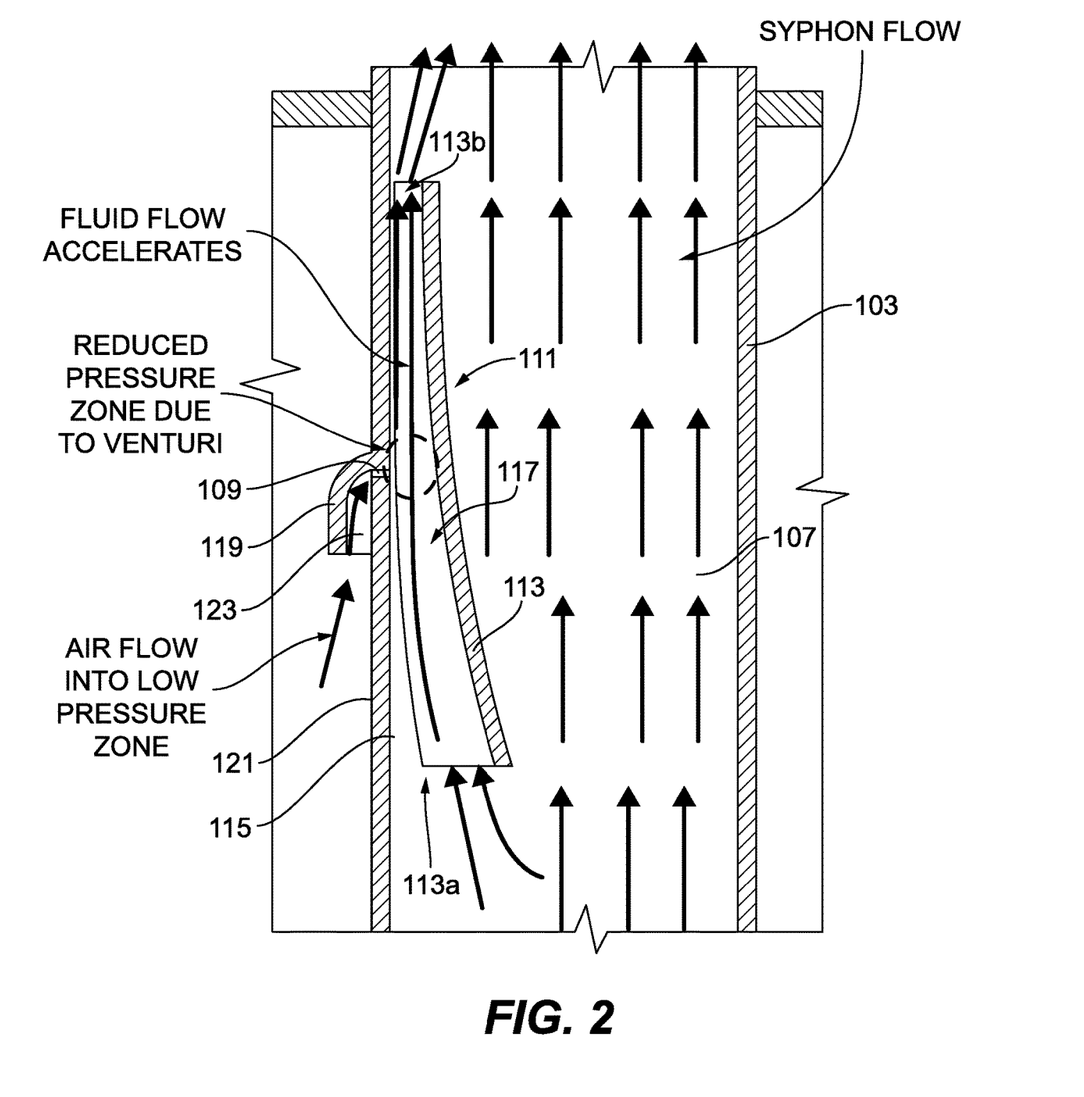
FIG. 2 is a cross-sectional, zoomed view of the embodiment of FIG. 1, shown in a syphoning state.
Figure 3:
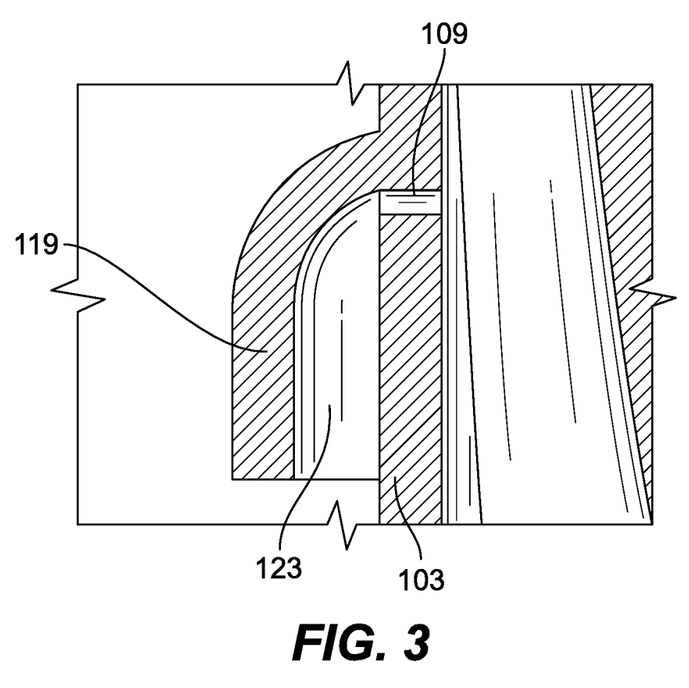
FIG. 3 is a cross-sectional zoomed view of a relief hole of the embodiment of FIG. 1.

Referring additionally to FIGS. 2 and 3, the tube 101 can include a relief hole 109 defined through the tube body 103. The tube 101 can include a venturi structure 111 in the vent channel 107 of the tube body 103, e.g., at least partially over the relief hole 109. The venturi structure 111 can be configured to reduce pressure over the relief hole 109 as a function of flow (e.g., syphon flow as shown) in the vent channel 107.

The venturi structure 111 can be defined by and integral with the tube body 103, for example. In certain embodiments, the venturi structure 111 can be a separate component placed in and/or attached to the tube body 103.

The venturi structure 111 can include a wall 113 extending across the vent channel 107, for example. The wall 113 can define an inlet 113a and an outlet 113b between the wall 113 and an interior surface 115 of the tube body 103. In certain embodiments, the inlet 113a can include a larger flow area than the outlet 113b.

In certain embodiments, the wall 113 can include an angled or curved shape in a direction of flow to form a reducing channel 117 between the wall 113 and the interior surface 115 of the tube body 113. For example, the wall 113 can be an angled or curved plate, e.g., as shown. In certain embodiments, the wall 113 can be straight and the interior wall 115 of the tube body 113 can be shaped to form the reducing channel 117. The reducing channel 117 can be linearly reducing and/or non-linearly reducing, for example.

In certain embodiments, the reducing channel 117 can be about ten times as long as the distance across the inlet 113a (e.g., if square shaped inlet). In certain embodiments, the outlet 113b can have about one fourth of the flow area of the inlet 113b. In certain embodiments, the position of relief hole 109 can be where the flow through the reducing channel 117 is fastest. In certain embodiments, the reducing channel 117 can include an area of constant flow area downstream of the relief hole 109. In certain embodiments, the relief hole 109 can be positioned at an area of constant flow area. Any suitable shape, position, and/or dimensions for the inlet 113a, outlet 113b, the relief hold 109 and the reducing channel 117 is contemplated herein.

The tube 100 can include a scoop 119 extending from an outer surface 121 of the tube body 103 over the relief hole 109 to define a relief inlet channel 123. As shown, the scoop 119 can open downward with respect to a direction of gravity, for example. The scoop 119 can aid in directionally orienting airflow and/or preventing splash of liquid into the relief hole 109, e.g., during deaerating.

As shown, in certain embodiments, the tube body 103 can include a U-shape. Any other suitable shape is contemplated herein. Embodiments of a tube 101 can be made by, e.g., investment casing, injection molding, additive manufacturing, machining, and/or any other suitable method.

In accordance with at least one aspect of this disclosure, a deaerating system 100 can include a deaerator tank 105 configured to contain a liquid therein, and a tank vent tube 101 disposed partially in the deaerator tank 105. The tank vent tube 101 can include any suitable tank vent tube 101 disclosed herein (e.g., as described above).

Figure 4:
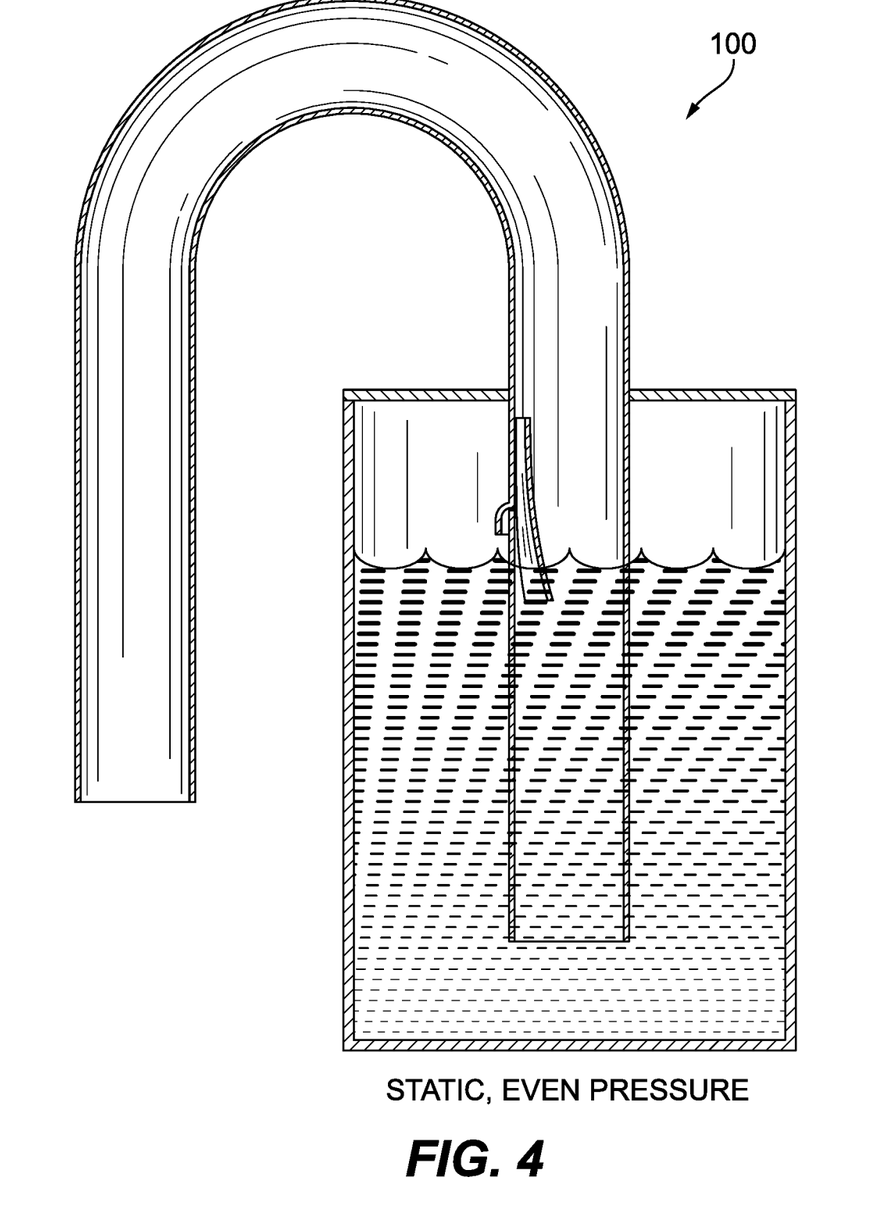
FIG. 4 is a cross-sectional view of the embodiment of the system of FIG. 1, showing the tank filled with a liquid in a static state with even pressure.
Figure 5:
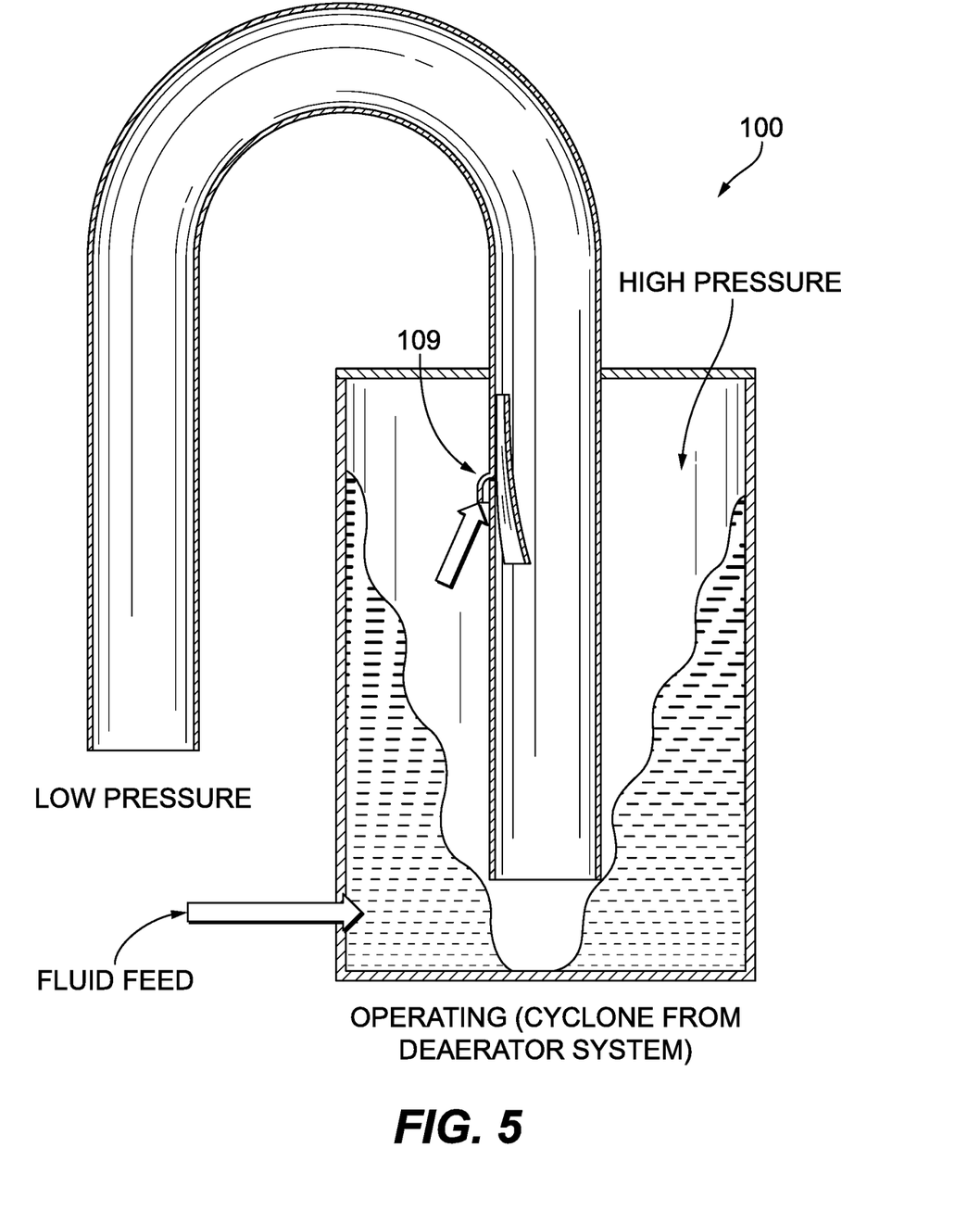
FIG. 5 is a cross-sectional view of the embodiment of the system of FIG. 1, showing the tank in deaerator operation.
Figure 6:
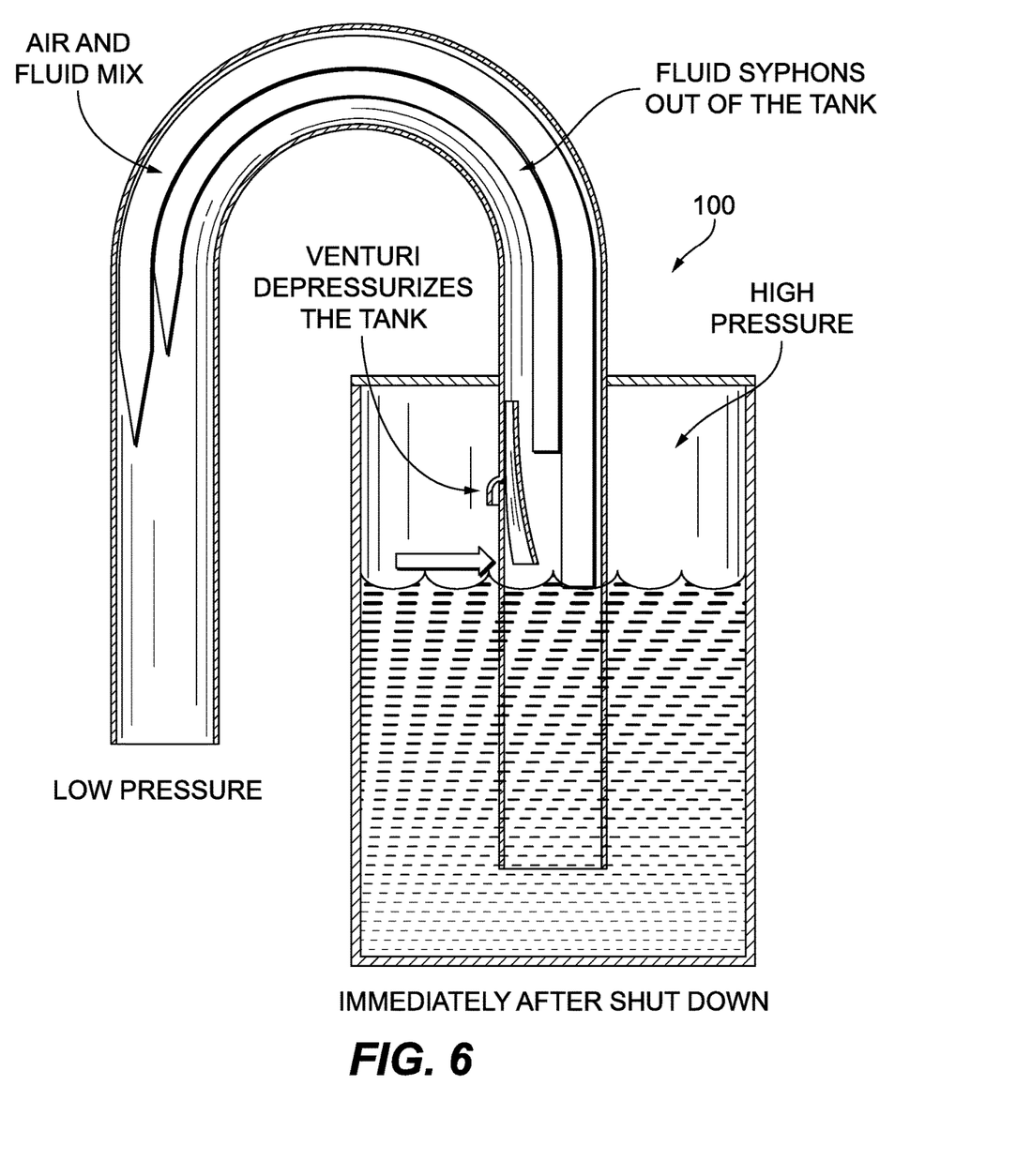
FIG. 6 is a cross-sectional view of the embodiment of the system of FIG. 1, showing the tank in after deaerator operation where a high pressure differential exists.

As shown in FIG. 4, in a static state, there is no pressure differential between the air in the tank 105 and the atmosphere (e.g., the vent location). As shown in FIG. 5, in deaerating, a cyclone is created and a high pressure forces air out through the tube 101. Any suitable embodiment of a deaerator system disclosed herein can be configured to cause a cyclone in the tank in any suitable manner as appreciated by those having ordinary skill in the art. As shown in FIG. 6, immediately after shut down, a high pressure head still exists such that there is a pressure differential causing a syphoning effect. However, the syphoning of liquid (e.g., oil) through the venturi structure 111, e.g., as shown in FIG. 2, creates a suction to more rapidly draw air out of the tank and equalize the pressure to prevent further suction.

In accordance with at least one aspect of this disclosure, a method can include increasing speed of a flow in a tank vent tube over a relief hole in the tank vent tube to reduce pressure equalization time and reduce fluid loss through the vent tube. Any other suitable method and/or portion(s) thereof as appreciated by those having ordinary skill in the art in view of this disclosure are contemplated herein.

Embodiments can include a venturi structure that depressurizes the tank quicker than traditional embodiments without the venturi structure. Embodiments may have no meaningful effect on normal operation of the deaerating system. Embodiments can quickly depressurize when liquid is syphoned through due to the venturi action and can provide minimal change in tank liquid level, e.g., after shut down. Certain embodiments can reduce oil loss by about 50% to about 75% of traditional systems.

By adding a flow acceleration in the tube, a venturi effect will draw venting air quickly into the system, rapidly depressurizing the tank. Since such systems are more effective with liquid fluid flow, the venturi effect is improved. Such an effect is only meaningful when the syphon effect is taking place. When the tube is flowing air (e.g., typical operation for a deaerator), the venturi effect is reduced and air flow from the tank into the relief hole is minimal. This can prevent disruption of the proper function during operating when no fluid is flowing.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

Any suitable combination(s) of any disclosed embodiments and/or any suitable portion(s) thereof are contemplated herein as appreciated by those having ordinary skill in the art.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A tank vent tube for a deaerator tank system, comprising:
   a tube body configured to mount to a deaerator tank, the tube body defining a vent channel;
   a relief hole defined through the tube body; and
   a venturi structure in the vent channel of the tube body at least partially over the relief hole, wherein the venturi structure is configured to reduce pressure over the relief hole as a function of flow in the vent channel, wherein the venturi structure includes a wall extending across the vent channel, wherein the wall defines an inlet and an outlet between the wall and an interior surface of the tube body, wherein the inlet includes a larger flow area than the outlet, wherein the inlet is upstream of the relief hole.

2. The tank vent tube of claim 1, wherein the venturi structure is defined by and integral with the tube body.

3. The tank vent tube of claim 1, wherein the wall includes an angled or curved shape in a direction of flow to form a reducing channel between the wall and the interior surface of the tube body.

4. The tank vent tube of claim 3, wherein the wall includes an angled or curved plate.

5. The tank vent tube of claim 1, further comprising a scoop extending from an outer surface of the tube body over the relief hole to define a relief inlet channel.

6. The tank vent tube of claim 5, wherein the scoop opens downward with respect to a direction of gravity.

7. The tank vent tube of claim 1, wherein the tube body includes a U-shape.

8. A deaerating system, comprising:
a deaerator tank configured to contain a liquid therein; and
a tank vent tube disposed partially in the deaerator tank, the vent tube comprising:
a tube body mounted to a deaerator tank and at least partially in the deaerator tank, the tube body defining a vent channel;
a relief hole defined through the tube body; and
a venturi structure in the vent channel of the tube body at least partially over the relief hole, wherein the venturi structure includes a wall extending across the vent channel, wherein the wall defines an inlet and an outlet between the wall and an interior surface of the tube body, wherein the inlet is includes a larger flow area than the outlet, wherein the inlet us upstream of the relief hole.

9. The system of claim 8, wherein the venturi structure is defined by and integral with the tube body.

10. The system of claim 8, wherein the wall includes an angled and/or curved shape in a direction of flow to form a reducing channel between the wall and the interior surface of the tube body.

11. The system of claim 10, wherein the wall includes an angled or curved plate.

12. The system of claim 8, further comprising a scoop extending from an outer surface of the tube body over the relief hole to define a relief inlet channel.

13. The system of claim 12, wherein the scoop opens downward with respect to a direction of gravity.

14. The system of claim 8, wherein the tube body includes a U-shape.

* * * * *